(12) United States Patent
Romero et al.

(10) Patent No.: US 11,644,375 B2
(45) Date of Patent: May 9, 2023

(54) INSERTION FORCE MEASUREMENT SYSTEM

(71) Applicant: GM GLOBAL TECHNOLOGY OPERATIONS LLC, Detroit, MI (US)

(72) Inventors: Carlos Roberto Romero, Toluca (MX); Farid Arturo Quiroz, Metepec (MX)

(73) Assignee: GM GLOBAL TECHNOLOGY OPERATIONS LLC

( * ) Notice: Subject to any disclaimer, the term of this patent is extended or adjusted under 35 U.S.C. 154(b) by 195 days.

(21) Appl. No.: 17/010,905

(22) Filed: Sep. 3, 2020

(65) Prior Publication Data
US 2022/0065720 A1    Mar. 3, 2022

(51) Int. Cl.
*G01L 1/08* (2006.01)
*G01L 5/22* (2006.01)
*G01L 1/00* (2006.01)

(52) U.S. Cl.
CPC .............. *G01L 5/225* (2013.01); *G01L 1/005* (2013.01); *G01L 1/083* (2013.01)

(58) Field of Classification Search
CPC ................... B66D 3/18–24; B25J 5/06; G01L 5/226–228; B60R 2011/0091–0092
See application file for complete search history.

(56) References Cited

U.S. PATENT DOCUMENTS

| | | | | |
|---|---|---|---|---|
| 3,727,968 A * | 4/1973 | Tsuchihashi | .............. | B66C 3/16 414/626 |
| 4,283,764 A * | 8/1981 | Crum | .................. | G05B 19/427 318/568.22 |
| 4,531,885 A * | 7/1985 | Molaug | .................... | B25J 9/046 901/22 |
| 5,133,465 A * | 7/1992 | Kalan | ..................... | B66C 17/00 212/315 |
| 5,207,554 A * | 5/1993 | Asakawa | ................. | B25J 15/00 901/29 |
| 5,828,813 A * | 10/1998 | Ohm | .......................... | B25J 3/04 700/260 |
| 5,915,673 A * | 6/1999 | Kazerooni | .............. | B66F 3/242 254/270 |
| 6,477,448 B1 * | 11/2002 | Maruyama | ............... | B25J 13/02 318/568.11 |
| 6,738,691 B1 * | 5/2004 | Colgate | .................. | B25J 9/1689 318/632 |
| 6,786,896 B1 * | 9/2004 | Madhani | ................ | A61B 34/30 606/1 |

(Continued)

*Primary Examiner* — Tran M. Tran
(74) *Attorney, Agent, or Firm* — Lorenz & Kopf LLP

(57) ABSTRACT

In accordance with an exemplary embodiment, a measurement device is provided that includes an actuator module, a control module, a load cell module, a processing module, and a notification module. The actuator module includes an actuator. The control module includes one or more actuator controllers configured to control the actuator. The load cell module includes one or more motors configured to set orientation of attachments points for the actuator with respect to a component relative to a location of a user. The processing module includes a processor configured to receive and analyze information from the load cell module pertaining to an insertion force for the component. The notification module is configured to provide a notification based on the analyzing performed by the processing module.

20 Claims, 5 Drawing Sheets

(56) References Cited

U.S. PATENT DOCUMENTS

| | | | |
|---|---|---|---|
| 6,923,613 B2 * | 8/2005 | Stuyt | B25J 9/102 414/735 |
| 7,027,031 B2 * | 4/2006 | Kawasaki | B25B 13/02 345/184 |
| 7,185,774 B2 * | 3/2007 | Colgate | B66C 17/00 212/331 |
| 7,222,839 B2 * | 5/2007 | Taylor | B66D 1/485 254/270 |
| 7,311,297 B1 * | 12/2007 | Bradshaw | B66D 3/18 254/326 |
| 7,334,776 B2 * | 2/2008 | Kazerooni | B66D 3/18 414/466 |
| 7,489,309 B2 * | 2/2009 | Levin | G06F 3/016 345/184 |
| 7,559,533 B2 * | 7/2009 | Stockmaster | B66D 3/18 254/270 |
| 7,568,880 B2 * | 8/2009 | Horie | B25J 9/1065 414/917 |
| 7,756,601 B1 * | 7/2010 | Van Dyke | B66D 3/18 414/541 |
| 7,784,333 B2 * | 8/2010 | Nemoto | G01B 21/04 73/104 |
| 7,915,889 B2 * | 3/2011 | Shintani | G01D 5/145 324/207.25 |
| 8,479,675 B2 * | 7/2013 | Allegrini | B63B 29/12 114/191 |
| 8,648,797 B2 * | 2/2014 | Nagasaka | G06F 3/014 345/157 |
| 8,813,347 B2 * | 8/2014 | Menassa | H05K 1/0268 73/862.041 |
| 8,847,845 B2 * | 9/2014 | Ahring | H01Q 1/1242 343/882 |
| 8,981,962 B2 * | 3/2015 | Fu | F16M 11/2078 340/576 |
| 9,215,968 B2 * | 12/2015 | Schostek | B25J 19/06 |
| 9,283,672 B1 * | 3/2016 | Matthews | B25J 19/023 |
| 9,346,165 B1 * | 5/2016 | Metzger | B25J 9/1674 |
| 9,354,134 B2 * | 5/2016 | Commo | G01M 9/062 |
| 9,505,138 B2 * | 11/2016 | Sasaki | B25J 18/00 |
| 9,708,135 B2 * | 7/2017 | Xu | B25J 13/085 |
| 10,180,336 B2 * | 1/2019 | Bremerkamp | G01D 5/24 |
| 10,525,586 B2 * | 1/2020 | Owa | B25J 17/02 |
| 10,709,512 B2 * | 7/2020 | Bajo | A61B 34/71 |
| 10,928,000 B2 * | 2/2021 | Ren | A47B 9/04 |
| 11,033,346 B2 * | 6/2021 | Higuchi | A61B 34/37 |
| 11,034,557 B2 * | 6/2021 | Hartke | A01K 29/00 |
| 11,045,963 B2 * | 6/2021 | Landwehr | B26B 11/008 |
| 11,052,288 B1 * | 7/2021 | Berme | A63B 71/0622 |
| 11,148,295 B2 * | 10/2021 | Correll | B25J 9/1697 |
| 11,298,832 B2 * | 4/2022 | Nagasaka | B25J 13/085 |
| 11,305,423 B2 * | 4/2022 | Iwase | B25J 13/085 |
| 2002/0144970 A1 * | 10/2002 | Seith | B66C 13/40 212/285 |
| 2014/0217906 A1 * | 8/2014 | Vo | H05B 47/195 315/149 |
| 2016/0318181 A1 * | 11/2016 | Gowda | F16M 11/18 |
| 2018/0031456 A1 * | 2/2018 | Yung | G01N 3/062 |
| 2018/0132953 A1 * | 5/2018 | Neupert | B25J 9/161 |
| 2019/0126843 A1 * | 5/2019 | Bouchard | G01S 19/14 |
| 2019/0217788 A1 * | 7/2019 | Buchhalter | F16M 11/041 |
| 2020/0108782 A1 * | 4/2020 | Macneille | G09G 5/00 |

* cited by examiner

INSERTION FORCE MEASUREMENT SYSTEM

INTRODUCTION

The technical field generally relates to measurement systems and, more particularly, to systems for measuring insertion forces, for example for assessing ergonomic conditions for a customer environment for a vehicle.

Various systems are used today to measure insertion forces. However, existing measurement systems may not always be optimal in certain situations, for example when a user changes position.

Accordingly, it is desirable to provide improved systems for measuring insertion forces, for example for assessing ergonomic conditions for a customer environment for a vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a measurement device is provided that includes an actuator module, a control module, a load cell module, a processing module, and a notification module. The actuator module includes an actuator. The control module includes one or more actuator controllers configured to control the actuator. The load cell module includes one or more motors configured to set orientation of attachments points for the actuator with respect to a component relative to a location of a user. The processing module includes a processor configured to receive and analyze information from the load cell module pertaining to an insertion force for the component. The notification module is configured to provide a notification based on the analyzing performed by the processing module.

Also in an exemplary embodiment, the component includes a component for installation in a vehicle.

Also in an exemplary embodiment, the actuator includes a pneumatic linear actuator with position feedback control.

Also in an exemplary embodiment, the pneumatic linear actuator controls a position of the component in a z-axis.

Also in an exemplary embodiment, the one or more motors of the load cell module include one or more step motors.

Also in an exemplary embodiment, the one or more step motors include one or more three step motors.

Also in an exemplary embodiment, the notification module includes a traffic light device that displays one of a plurality of colors based on a comparison with results of the information with acceptance criteria.

Also in an exemplary embodiment, the processor is configured to translate the information from the load cell into digital data, plot and analyze the digital data, and transform the information to the step motors to locate the control module at a desired position.

Also in an exemplary embodiment, the measurement system is configured to allow a connection point for the measurement system to be set at different locations from the user's position and at different angles from the user's hand.

Also in an exemplary embodiment, the user may utilize the measurement device by merely using or "playing" with the component being examined, via the measurement device, in a common way in which the user would ordinarily perform in a working environment.

In another exemplary embodiment, a measurement device is provided that includes a pneumatic linear actuator; one or more actuator controllers; one or more step motors; a processor; and a lighting device. The one or more actuator controllers are configured to control the pneumatic linear actuator. The one or more step motors are configured to set orientation of attachments points for the pneumatic linear actuator with respect to a component relative to a location of a user. The processor is configured to receive and analyze information from the one or more step motors as to an insertion force of the component. The lighting device is configured to provide lighting with one of a plurality of different light colors based on the analyzing performed by the processor.

Also in an exemplary embodiment, the component includes a component for installation in a vehicle.

Also in an exemplary embodiment, the pneumatic linear actuator with position feedback control includes pneumatic linear actuator controls a position of the component in a z-axis.

Also in an exemplary embodiment, the one or more step motors include one or more three step motors.

Also in an exemplary embodiment, the lighting device includes a traffic light device that displays one of a plurality of colors based on a comparison with results of the information with acceptance criteria.

Also in an exemplary embodiment, the processor is configured to translate the information from the one or more step motors into digital data, plot and analyze the digital data, and transform the information to the step motors to locate the control module at a desired position.

Also in an exemplary embodiment, the measurement system is configured to allow a connection point for the measurement system to be set at different locations from the user's position and at different angles from the user's hand.

Also in an exemplary embodiment, the user may utilize the measurement device by merely using or "playing" with the component being examined, via the measurement device, in a common way in which the user would ordinarily perform in a working environment.

Also in an exemplary embodiment, a system is provided that includes a housing and a measurement system. The measurement system includes a pneumatic linear actuator, one or more actuator controllers, a processor, and a lighting device. The one or more actuator controllers are configured to control the pneumatic linear actuator. The one or more step motors are configured to set orientation of attachments points for the pneumatic linear actuator with respect to a component relative to a location of a user. The processor is configured to receive and analyze information from the one or more step motors as to an insertion force of the component. The lighting device is configured to provide lighting with one of a plurality of different light colors based on the analyzing performed by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
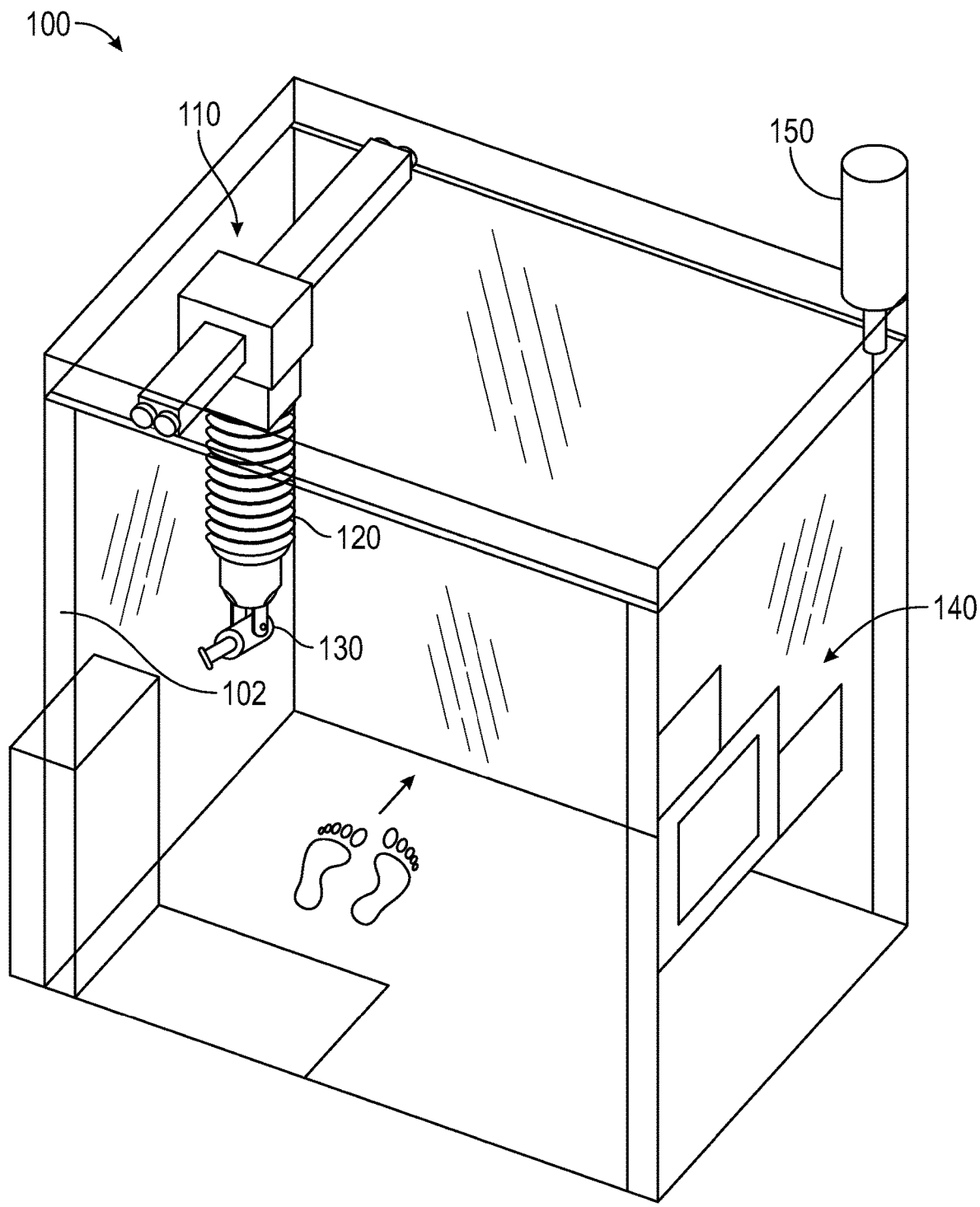
FIG. 1 is a perspective view of a measurement system for measuring an insertion force, for example for assessing ergonomic conditions for a customer environment for a vehicle, in accordance with an exemplary embodiment.

FIG. 1 is a perspective view of a measurement system 100 for measuring an insertion force, in accordance with an exemplary embodiment. In various embodiments, the measurement system 100 is utilized for assessing ergonomic conditions for a customer environment for a vehicle, for example during development, engineering, and testing of a model of the vehicle. However, in various other embodiments, the measurement system 100 may also be utilized in connection with any number of other different applications.

In various embodiments, the measurement system 100 is in the shape of a box, or cube, as depicted in FIG. 1. However, in other embodiments, the measurement system 100 may take any number of other different shapes depending of the application.

Also in various embodiments, the measurement system 100 is embedded with, coupled to, and/or otherwise utilized in connection with one or more implementation systems, for example for assessing ergonomic conditions for a customer environment for a vehicle, for example during development, engineering, and testing of a model of the vehicle (and/or for one or more other implementations)

Figure 2:
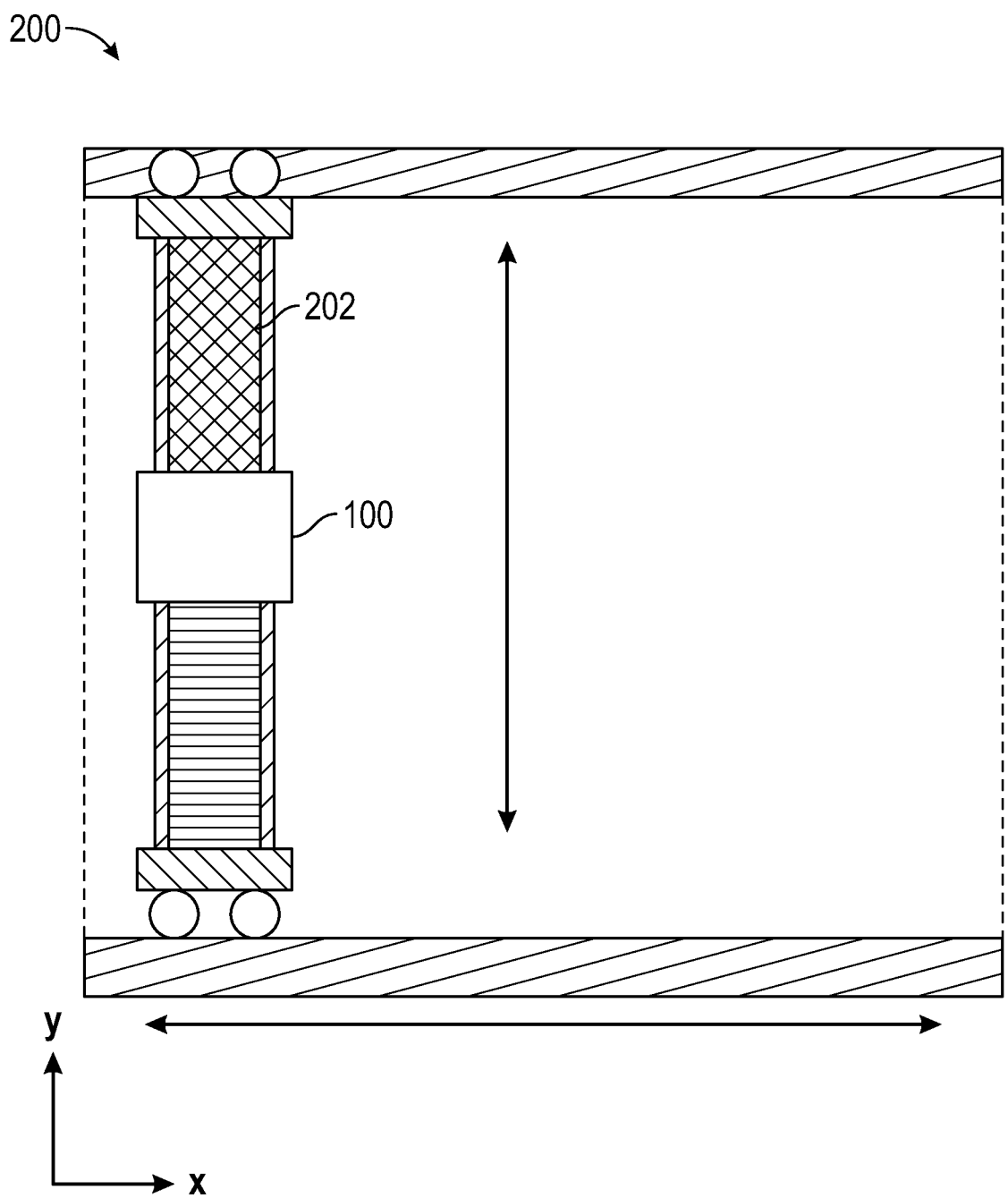
FIG. 2 depicts an implementation system in which the measurement system of FIG. is implemented, in accordance with an exemplary embodiment.

FIG. 2 depicts an exemplary implementation system 200 in which the measurement system 100 of FIG. 1 may be utilized, in connection with an exemplary embodiment. Specifically, in accordance with an exemplary embodiment, FIG. 2 depicts an upper view of the module 110 (described in greater detail further below), which in an exemplary embodiment comprises a module into displacement rods to allow linear movement over the X and Y axis to change the location of the module 130. In various embodiments, the measurement system 100 is embedded as a controller box 100 within a housing as part of a larger implantation system 200. In various embodiments, the implementation system 200 may include one or more vehicle components (e.g., for installation in a vehicle) that are experienced by an occupant of a vehicle, such as an automobile, motorcycle, truck, other land vehicle, water vehicle, aircraft, spacecraft, and/or any number of other types of vehicles.

With reference back to FIG. 1, in various embodiments, the measurement system 100 of FIG. 1 includes the following modules: (i) a first module, known as, control module 110 (depicted in FIG. 3 and described further below in connection therewith); (ii) a second module, called, actuator module 120 (depicted in FIG. 4 and described further below in connection therewith); (iii) a third module, named load measurement module 130 (depicted in FIG. 5 and described further below in connection therewith); (iv) a fourth module, which comprises a signal processing module and results deployment system identified by the number 140 (depicted in FIG. 6 and described further below in connection therewith); and (v) (i) a fifth module, known as results visualization module 160 (depicted in FIG. 7 and described further below in connection therewith).

Figure 3:
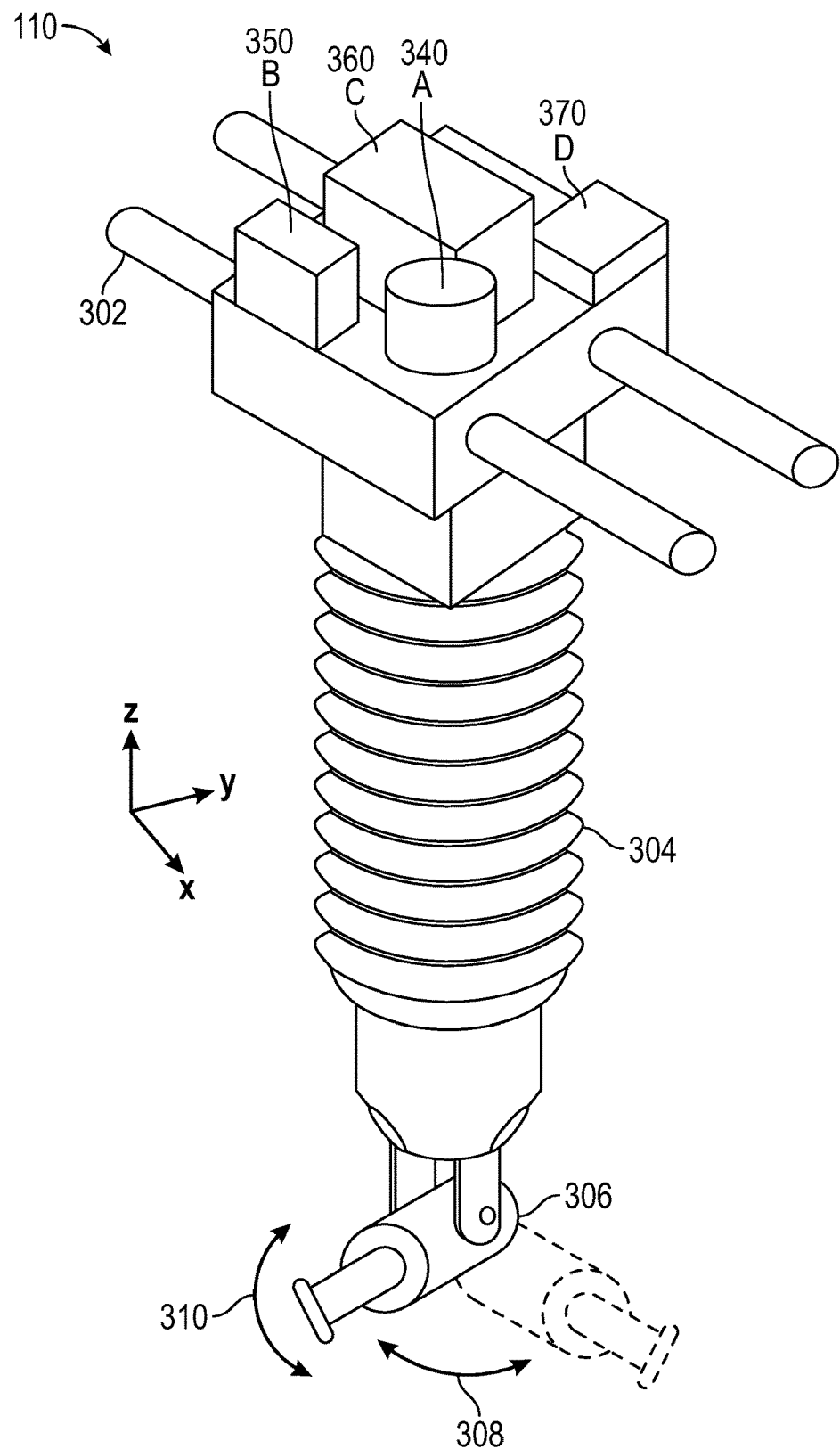
FIG. 3 depicts a first module of the measurement system of FIG. 1, namely, a control module thereof, in accordance with an exemplary embodiment.

FIG. 3 depicts the first module of the measurement system 100 of FIG. 1, namely, the control module 110 thereof, in accordance with an exemplary embodiment. In various embodiments, the control module 100 includes all power stages for the measurement system 100. The control module 100 further includes cooling stages, actuator peripherals, actuator controllers, step motor controllers (for example, e.g., for speed, position) and cable management systems for the electric motors and actuators for the measurement system 100 of FIG. 1.

Specifically, in the depicted embodiment of FIG. 3, the control module 110 includes a plurality of displacement rods 302 along with a retractable rubber convolute 304. In addition, also in the depicted embodiment, the control module 110 further includes a step motor controller that includes both a speed controller and an encoder, along with a plurality of cooling plates coupled thereto. In addition, in various embodiments, the control module 110 further includes a power supply, along with a linear actuator controller and a linear actuator power supply. Also, in various embodiments, the control module 110 further includes various cables and peripherals for the management system. Also in various embodiments, depicted in FIG. 3 are: (i) a step motor controller "A" 340 for linear X-Y displacements; (ii) step motor heat sinks (air or water) "B" 350; (iii) power supply and position controller "C" 360 for pneumatic linear actuator; and (iv) power supply stage "D" 370 for step motors and controllers (different voltage supplies: +5V, +12 V, +24V or +48V as needed).

Also as depicted in FIG. 3, in various embodiments, the control module 110 further includes a rotating appendage 306. In various embodiments, the rotating appendage 306 rotates over both an x-axis (for example, as depicted with rotation arrow 308 in FIG. 3) as well as a y-axis (for example, as depicted with rotation arrow 310 in FIG. 3). In various embodiments, the rotating appendage 310 allows the connection point to be set at different locations from the user's position (X, Y, Z) and at different angles (θx, θy, θz) from the user's hand, for example for different movements of the user (such as movement of the user's arm, by way of example).

Figure 4:
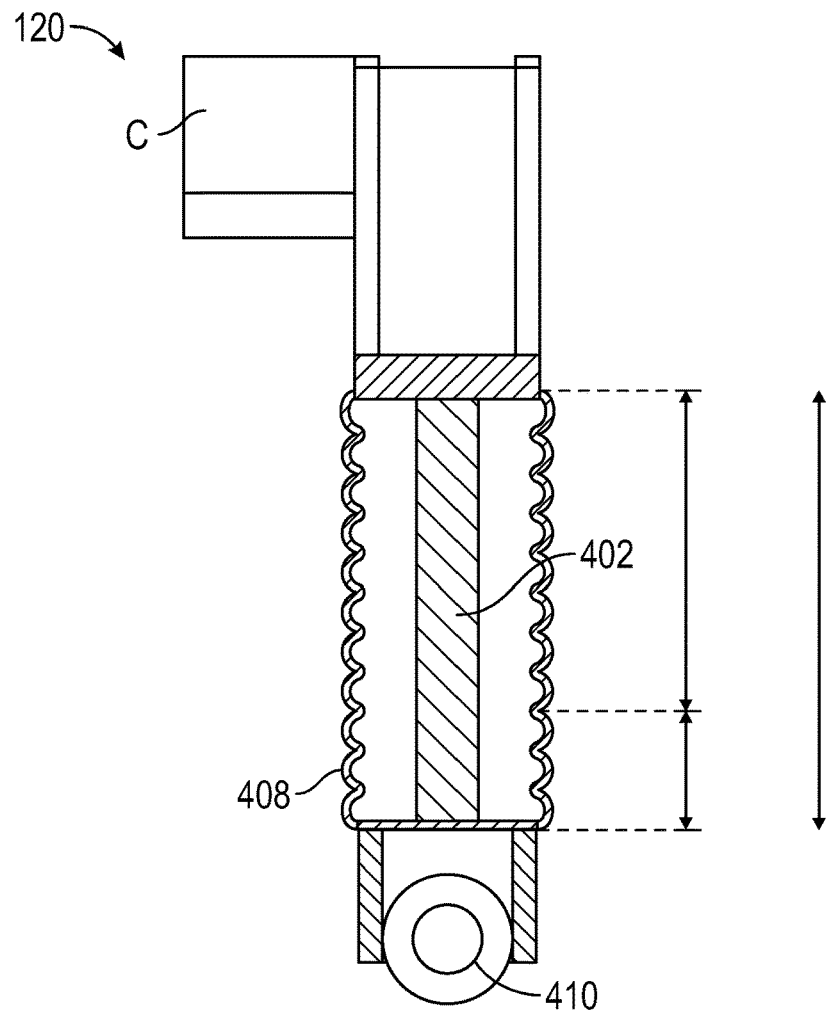
FIG. 4 depicts a second module of the measurement system of FIG. 1, namely, an actuator module thereof, in accordance with an exemplary embodiment.

FIG. 4 depicts the second module 120 of the measurement system 100 of FIG. 1, namely, the actuator module 120 thereof, in accordance with an exemplary embodiment. As depicted in FIG. 4, in various embodiments, the actuator module 120 includes an actuator 402. In various embodiments, the actuator 402 comprises a linear pneumatic actuator with position feedback, for example with respect to exemplary changes in position (1) 404 and 406 depicted in FIG. 4. In various embodiments, the linear pneumatic actuator 402 is disposed inside a retractable rubber convolute 408 to work as protective cover against dust or debris from the environment.

As depicted in FIG. 4, in various embodiments, the actuator module 120 is coupled to an evaluation component 410 that is to be evaluated. In certain embodiments, the evaluation component 410 comprises one or more vehicle components. However, this may vary in other embodiments.

In addition, in certain embodiments, the evaluation component (including the actuator 402 and the rubber convolute 408) may be changed according with the needs of the component 410 to evaluate.

Also in various embodiments, the actuator module 120 serves as an attachment point for the third module (or the load cell module) 130 that is described in further detail below. As depicted in FIG. 4, in various embodiments, the pneumatic actuator allows for change in location of the module 130, for example as shown in the double arrow up to down, showing displacement in the +/−Z axis up and down, per application needs with respect the user's position in the measurement device.

Figure 5:
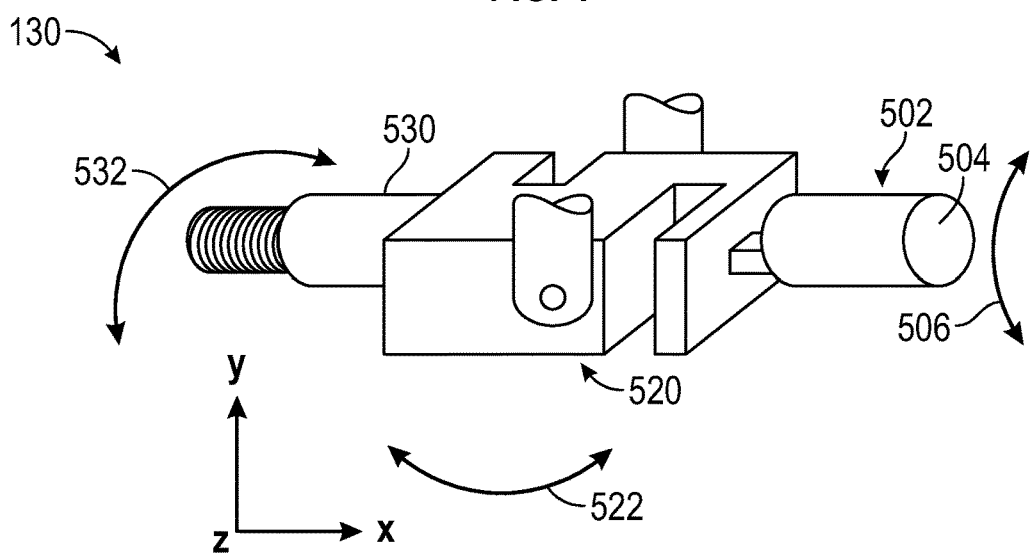
FIG. 5 depicts a third module of the measurement system of FIG. 1, namely, a load cell module thereof, in accordance with an exemplary embodiment.

FIG. 5 depicts the third module of the measurement system 100 of FIG. 1, namely, the load cell module 130 thereof, in accordance with an exemplary embodiment. As depicted in FIG. 5, the load cell module 130 includes a three step motor 502 with a rotating head 504. In various embodiments, the three step 502 is configured to be set in accordance with an orientation of the attachment points per vehicle's position relative to user's location. In an exemplary embodiment, the rotating head 504 has three degrees of freedom (DOF) that allows the orientation to be set at different angles along an x-axis of rotation 506. In certain embodiments, this serves as a type of a robotic wrist.

Also as depicted in FIG. 5, in various embodiments, the load cell module 130 includes a load cell 520 having a z-axis rotation 522. In various embodiments, the load cell 520 is connected to and coupled to the three step motor 502, and obtains information including measurements as to an insertion force of a component (in one embodiment, a component to be installed in a vehicle). In addition, in various embodiments, the load cell 520 includes and/or is connected to and/or coupled to and end rotation component 530 with rotation around a y-axis 532.

With continued reference to FIG. 5, in various embodiments, a user sets the position in which he or she wishes to hold the position for the measurement device 100 and/or implementation device 200, and then the load cell module 130 is set to this position. Also in various embodiments, the load cell module 130 is the position and orientation of the interface in the real world. Also in various embodiments, a different user can change the installation point at any position to fit the other user's needs, and so on. In addition, in various embodiments, the user may utilize the measurement device by merely using or "playing" with the vehicle component being examined, via the measurement device 100, in a common way in which the user would ordinarily do in the working environment.

Figure 6:
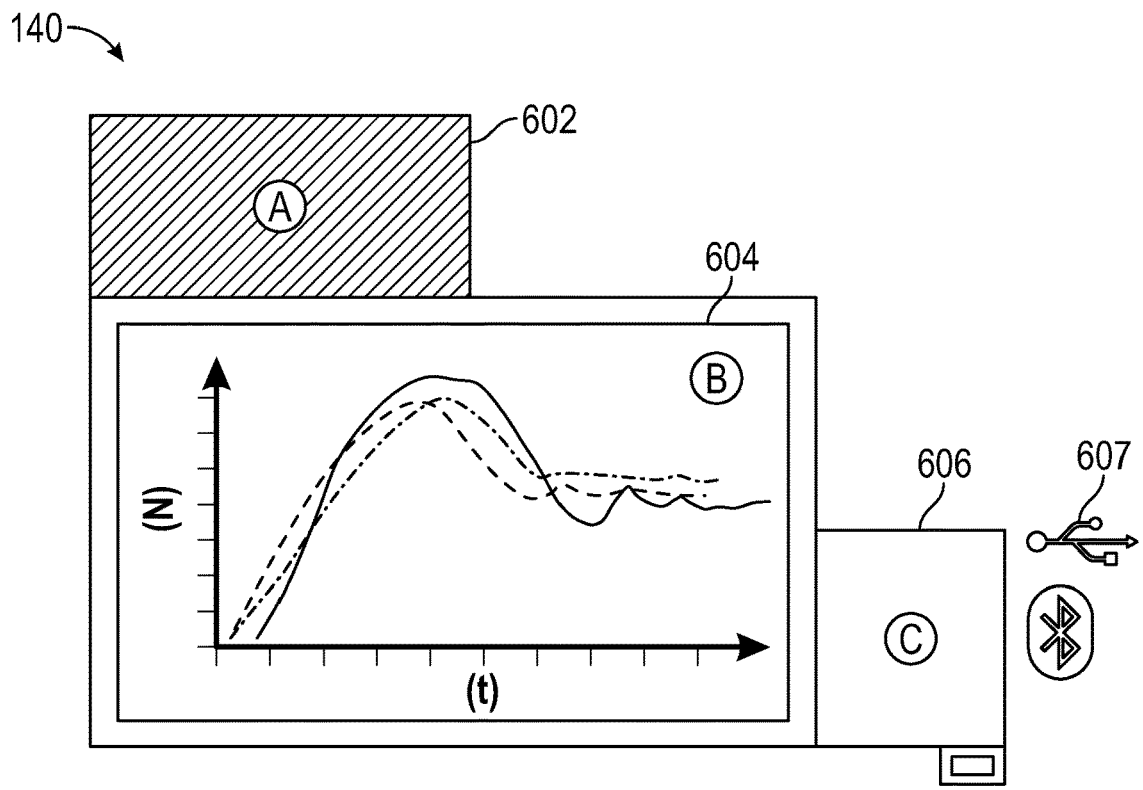
FIG. 6 depicts a fourth module of the measurement system of FIG. 1, namely, a signal processing module thereof, in accordance with an exemplary embodiment.

FIG. 6 depicts the fourth module of the measurement system 100 of FIG. 1, namely, the signal processing module and results deployment system module 140 thereof, in accordance with an exemplary embodiment. As depicted in FIG. 6, the signal processing module 140 includes a converter 602, a touch screen 604, and a processor 606. In various embodiments, the converter 602 comprises an analog to digital converter. Also in various embodiments, the converter 602 "translates" the information from the load cell 520 of FIG. 5 as to the insertion force of the component into digital data to be plotted and analyzed by the processor 606. In various embodiments, the converter 602 also sends and transforms the signal to the step motors 502 of FIG. 5 in order to locate the control module 110 of FIG. 3 at the desired position.

With further reference to FIG. 6, in an exemplary embodiment the touch screen 604 is configured to display, in real time, the measurements from the load cell 520 of FIG. 5. In certain embodiments, the touch screen 604 comprises a light-emitting diode (LED) display screen; however, this may vary in other embodiments. Also in various embodiments, the display (and/or related information) may be provided for the user of the measurement system 100 and/or for one or more different clients (e.g., in certain embodiments, one or more other individuals examining vehicle component for design and/or testing of a vehicle model, and so on).

Also in various embodiments, with continued reference to FIG. 6, the processor comprises a computer microprocessor. In various embodiments, the processor 606 provides instructions and control for the signal processing module 140, and for the measurement system 100 in general. Also in various embodiments, the processor 606 is part of a computer system that includes or is coupled to a power supply and additional electronics for data management systems, and that further includes connecting apparatus (e.g., USB port 607 depicted in FIG. 6) along with to extract the results for further analysis. In certain embodiments, the processor 606 and/or the accompanying computer system may also include and/or be coupled to a wireless module (for example, a short-range wireless module, such as a Bluetooth module) to improve the communication and data sharing with mobile devices.

Figure 7:
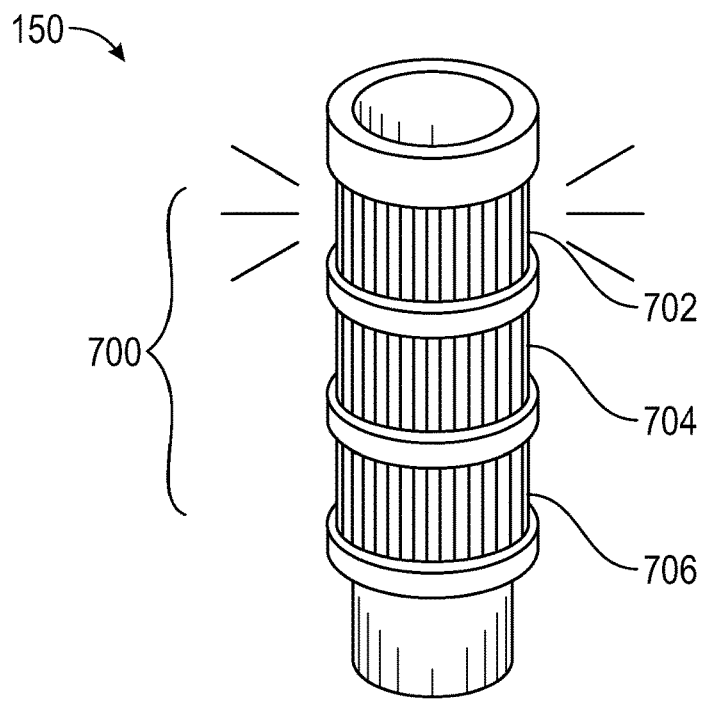
FIG. 7 depicts a fifth module of the measurement system of FIG. 1, namely, a notification module thereof, in accordance with an exemplary embodiment.

FIG. 7 depicts the fifth module of the measurement system 100 of FIG. 1, namely, the notification module 150 thereof, in accordance with an exemplary embodiment. As depicted in FIG. 7, in various embodiments the notification module 150 provides a notification or indication as to whether measured results meet predetermined acceptance criteria.

In certain embodiments, the notification module 150 comprises a "traffic light" module that provides different colors depending on how the measured data compares with the predetermined acceptance criteria. For example, in certain embodiments, the notification module 150 includes a light display 700 with multiple colors, namely: (i) a first color 702 (for example, green); (ii) a second color 704 (for example, yellow); and (iii) a third color 706 (for example, red). By way of example in an exemplary embodiment: (i) the light display 700 shines green when a measured force or load is well below a predetermined maximum value (and/or is within an acceptable range); (ii) the light display 700 shines yellow when a measured force or load is close to (e.g., within a predetermined amount from) a predetermined maximum value (and/or is within a borderline acceptable/unacceptable range); and (iii) the light display 700 shines green when a measured force or load is greater to a predetermined maximum value (and/or is within an unacceptable range).

Accordingly, a measurement system and an accompanying implementation system are provided for measuring insertion forces, for example for assessing ergonomic conditions for a customer environment for a vehicle. In various embodiments, the measurement system includes a cube, or box that includes each of the following: (i) a control module; (ii) an actuator module; (iii) a load cell module; (iv) a signal processing module; and (v) a notification module. In various embodiments, the measurement system and implementation system may be utilized in a number of context as held within the hand of a user thereof.

In addition, also in various embodiments, the disclosure measurement system and implementation system allow the connection point to be set at different locations from the user's position and at different angles from the user's hand.

Moreover, also in various embodiments, as described above, a different user can change the installation point at any position to fit the other user's needs, and so on. In addition, in various embodiments, the user may utilize the measurement device by merely using or "playing" with the vehicle component being examined, via the measurement device, in a common way in which the user would ordinarily do in the working environment.

It will be appreciated that the measurement device 100, the implementation system 200, the various components thereof, along with systems disclosed in combination therewith, may differ from those depicted in FIGS. 1-7 and/or as described above. It will likewise be appreciated that implementations depicted in the Figures and/or as described above may also vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A measurement device comprising:
an actuator module including an actuator;
a control module including one or more actuator controllers configured to control the actuator, the control module further comprising a plurality of displacement rods and a rotating appendage configured to rotate over both an x-axis and a y-axis;
a load cell module comprising one or more motors configured to set orientation of attachments points for the actuator with respect to a component relative to a location of a user, wherein the load cell module and the rotating appendage are configured to allow the attachment points to be set at different locations from a position of the user in x,y, and z coordinates and at different angles from a hand of the user in x, y, and z coordinates for different movements of an arm of the user;
a processing module comprising a processor configured to receive and analyze information from the load cell module pertaining to an insertion force for the component as the component is inserted into a receptacle; and
a notification module comprising a lighting device configured to provide a color lighting notification based on the analyzing performed by the processing module.

2. The measurement device of claim 1, wherein the component comprises a component for installation in a vehicle.

3. The measurement device of claim 1, wherein the actuator comprises a pneumatic linear actuator with position feedback control.

4. The measurement device of claim 3, wherein the pneumatic linear actuator controls a position of the component in a z-axis.

5. The measurement device of claim 1, wherein the one or more motors of the load cell module comprise one or more step motors.

6. The measurement device of claim 5, wherein the one or more step motors comprise one or more three step motors.

7. The measurement device of claim 1, wherein the lighting device of the notification module comprises a traffic light device that displays one of a plurality of colors based on a comparison with results of the information with acceptance criteria, such that:
(i) a first color is displayed when the insertion force is less than a predetermined maximum value by at least a predetermined amount;
(ii) a second color, different from the first color, is displayed when the insertion force is less than the predetermined maximum value but not be at least the predetermined amount and
(iii) a third color, different from both the first color and the second color, is displayed when the insertion force is greater than the predetermined maximum value.

8. The measurement device of claim 1, wherein the processor is configured to translate the information from the load cell into digital data, plot and analyze the digital data, and transform the information to the step motors to locate the control module at a desired position.

9. The measurement device of claim 1, wherein the user may utilize the measurement device by merely using or "playing" with the component being examined, via the measurement device, in a common way in which the user would ordinarily perform in a working environment.

10. The measurement device of claim 1, wherein the measurement device is embedded as a controller box within a housing as part of a larger implantation system that includes the component for installation in a vehicle and that is experienced by an occupant of the vehicle.

11. A measurement device comprising:
a pneumatic linear actuator;
one or more actuator controllers configured to control the pneumatic linear actuator;
a plurality of displacement rods and a rotating appendage configured to rotate over both an x-axis and a y-axis;
one or more step motors configured to set orientation of attachments points for the pneumatic linear actuator with respect to a component relative to a location of a user, wherein the load cell module and the rotating appendage are configured to allow the attachment points to be set at different locations from a position of the user in x,y, and z coordinates and at different angles from a hand of the user in x, y, and z coordinates for different movements of an arm of the user;
a processor configured to receive and analyze information from the one or more step motors as to an insertion force of the component as the component is inserted into a receptacle; and
a lighting device configured to provide lighting with one of a plurality of different light colors based on the analyzing performed by the processor.

12. The measurement device of claim 11, wherein the component comprises a component for installation in a vehicle.

13. The measurement device of claim 11, wherein the pneumatic linear actuator with position feedback control includes pneumatic linear actuator controls a position of the component in a z-axis.

14. The measurement device of claim 11, wherein the one or more step motors comprise one or more three step motors.

15. The measurement device of claim 11, wherein the lighting device comprises a traffic light device that displays one of a plurality of colors based on a comparison with results of the information with acceptance criteria, such that:

(i) a first color is displayed when the insertion force is less than a predetermined maximum value by at least a predetermined amount;
(ii) a second color, different from the first color, is displayed when the insertion force is less than the predetermined maximum value but not be at least the predetermined amount and
(iii) a third color, different from both the first color and the second color, is displayed when the insertion force is greater than the predetermined maximum value.

16. The measurement device of claim 11, wherein the processor is configured to translate the information from the one or more step motors into digital data, plot and analyze the digital data, and transform the information to the step motors to locate the control module at a desired position.

17. The measurement device of claim 11, wherein the user may utilize the measurement device by merely using or "playing" with the component being examined, via the measurement device, in a common way in which the user would ordinarily perform in a working environment.

18. The measurement device of claim 11, wherein the measurement device is embedded as a controller box within a housing as part of a larger implantation system that includes the component for installation in a vehicle and that is experienced by an occupant of the vehicle.

19. A system comprising:
a housing; and
a measurement system comprising:
a pneumatic linear actuator;
a plurality of displacement rods and a rotating appendage configured to rotate over both an x-axis and a y-axis;
one or more actuator controllers configured to control the pneumatic linear actuator;
one or more step motors configured to set orientation of attachments points for the pneumatic linear actuator with respect to a component relative to a location of a user, wherein the load cell module and the rotating appendage are configured to allow the attachment points to be set at different locations from a position of the user in x,y, and z coordinates and at different angles from a hand of the user in x, y, and z coordinates for different movements of an arm of the user;
a processor configured to receive and analyze information from the one or more step motors as to an insertion force of the component as the component is inserted into a receptacle; and
a lighting device configured to provide lighting with one of a plurality of different light colors based on the analyzing performed by the processor.

20. The system of claim 19, wherein the component comprises a component for installation in a vehicle.

* * * * *